Dec. 22, 1925.

M. P. WINTHER 1,566,299

SELF PROPELLED RAILWAY CAR

Filed May 12, 1924     3 Sheets-Sheet 1

Inventor

M. P. Winther

By Fisher, ~~~~

Attorney

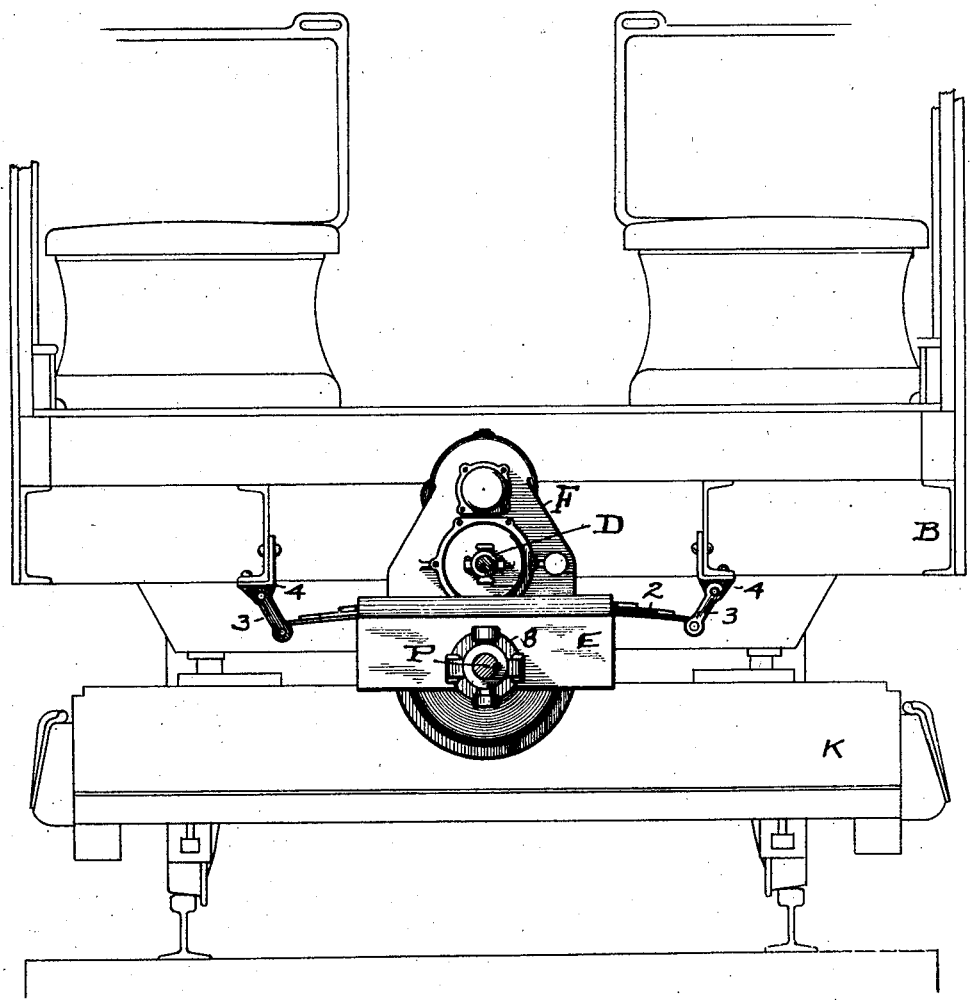

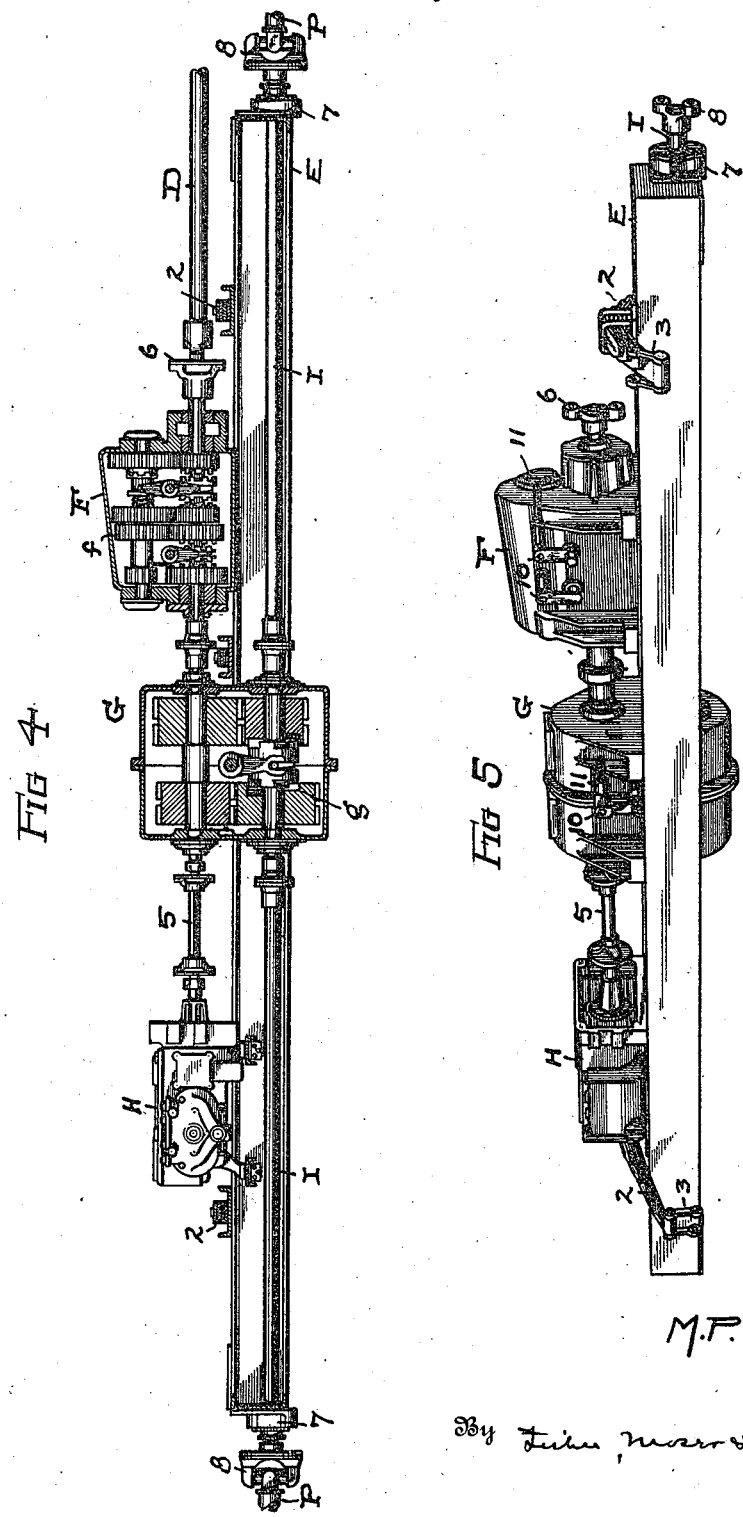

Patented Dec. 22, 1925.

1,566,299

UNITED STATES PATENT OFFICE.

MARTIN P. WINTHER, OF KENOSHA, WISCONSIN, ASSIGNOR TO THE SYKES COMPANY, OF ST. LOUIS, MISSOURI, A CORPORATION OF DELAWARE.

SELF-PROPELLED RAILWAY CAR.

Application filed May 12, 1924. Serial No. 712,564.

*To all whom it may concern:*

Be it known that I, MARTIN P. WINTHER, a citizen of the United States, residing at Kenosha, in the county of Kenosha and State of Wisconsin, have invented certain new and useful Improvements in a Self-Propelled Railway Car, of which the following is a specification.

The present invention relates to self-propelled railway cars and particularly rail cars in which the power is derived from an engine mounted upon the car or its main frame and transmitted through suitable speed change gearing to the wheels of one or more of the spring trucks of the car. Thus, the invention is especially applicable to rail cars operated by gasoline engines in which it is necessary or desirable that powerful change speed gears and other transmission devices be employed to permit the engine to be operated efficiently and to drive the car at different speeds and at greater average high speeds than in the self-propelled cars used on the highways.

Heavier loads and higher speeds demand speed-change units and transmission units built to operate accordingly, but a large and heavy transmission system and gearing operating at high speed causes noises and vibrations that are extremely annoying and objectionable in passenger coaches. This condition is aggravated in a passenger car in which an air compresser is installed for use in blowing a whistle, sanding the rails, and operating air brakes, especially where the air compressor is mounted directly upon the main frame of the car in driving connection with the engine.

Accordingly my primary object is to absorb and dampen the noise and vibration of the power transmitting devices and the air compressor or other apparatus operated by such devices or in conjunction therewith, and a further object is to mount such mechanism and apparatus where it may be conveniently accessible for inspection and repairs. As exemplified herein, I attain the desired objects by suspending a supplementary frame from the main frame by means of laminated leaf springs, and mounting a pair of transmission gear change units and an air compressor upon this sub-frame in flexible coupling connection with the gasoline engine and the driving wheels for the car, all as hereinafter shown and described and more particularly pointed out in the claims.

Figure 1:
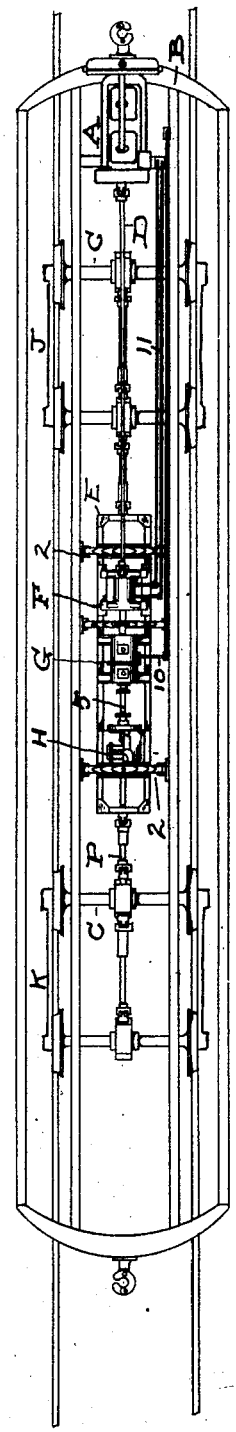
Figure 2:
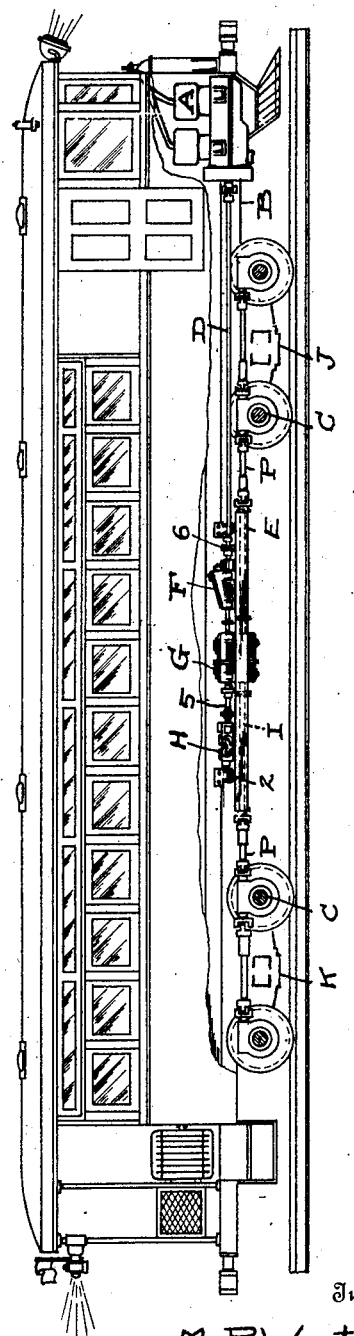

In the accompanying drawings, Fig. 1 is a reduced top view of the main frame of a rail car embodying my invention. Fig. 2 is a side elevation of a car, partly broken away, to disclose the sub-frame suspended from the main frame. Fig. 3 is an enlarged end view of the sub-frame and a cross sectional view of the main frame of the car. Fig. 4 is a longitudinal section and enlarged view of the sub-frame and the operating units carried thereon, and Fig. 5 is a perspective view thereof.

An accepted practice in operating a railway car or coach by a gasoline engine, is to mount the gasoline engine A upon the main frame B of the car, and to transmit the power to one or more of the wheel axles C by means of a shaft D extending longitudinally of the car. Transmission gearing and other devices are used in that connection, and a common practice is to mount such devices and gearing upon some fixed part of main frame B.

In contra-distinction, the present invention comprises a relatively long and narrow supplemental frame E fabricated from steel or wood and yieldingly suspended from frame B by two or more laminated leaf springs 2 fixed transversely to frame E by clips or other means and having their opposite ends engaged directly with or connected to frame B in any suitable way. For example, the ends of springs 2 may be formed with eyes and hung by shackles 3 from brackets 4 as shown in Fig. 3, or the ends of the springs may be pocketed or held in or upon brackets or mounted directly upon frame B.

Sub-frame E carries a transmission casing F containing clutch and gear mechanism *f* to impart different speeds and to reverse the direction of travel of the car, and the sub-frame also carries a second transfer gear case G containing clutch and gear mechanism adapted to drive separate propelling shafts P—P and the wheels of the separate car trucks at the opposite ends of the car. In addition sub-frame E supports a rotary air compressor H which is coupled in tandem with the gearing in casing F and case G by a sectional shaft 5, which is in turn connected by a universal coupling 6 to the main drive shaft D extending forwardly to gasoline engine A. A sectional power-transmitting shaft I extends forwardly and rearwardly from the lower half of gear case G lengthwise of sub-frame E, and the respective sections of shaft I are adapted to be driven at high and low speeds by the clutch and gear mechanism g in case G, and the outer ends of the shaft sections I are journaled in end bearings 7 in said frame and connected at their exposed ends by universal couplings 8—8 to the separate propeller shafts P—P which operate suitable gearing to drive one or both of the axles C—C of the front and rear car trucks, J and K, respectively, see Figs. 1 and 2.

By suspending sub-frame E by means of springs 2 from main frame B all the noise and vibration produced in operating the transmission gearing and mechanism and the air compressor is removed and isolated from the main frame or body B of the car and absorbed and dampened. At the same time the transmission gear casings and air compressor are supported in stable operating positions in an accessible place centrally between the trucks beneath the car body, with power shaft D and propeller shafts P—P lying in different but parallel horizontal planes. The various universal joints or couplings for the operating shafts permit the car body and the sub-frame to adapt themselves to any relative changes in position to each other and to the wheeled trucks which may be of the usual type having suitable cushioning springs.

Suitable operating and controlling devices are connected to and associated with the clutches and transmission gears in casing F and case G, and these may consist of levers 10 and operating rods 11 arranged and located wherever most convenient. In general the main controlling levers for gear shifting, etc., are placed within the front cab in convenient reach of the operator, but the location and type of the controls and the kind of transmission may vary, and therefore are subordinate to the actual invention shown and described herein. The invention is exemplified in its preferred form herein, but the details of construction may be modified and changed without departing from the scope and spirit of the invention, and the appended claims are to be so construed.

What I regard as my invention or discovery, and desire to claim, is:

1. A self-propelled car, comprising a main frame and mounted upon trucks and carrying an engine, and a sub-frame yieldingly suspended from said main frame and carrying power transmitting devices in operable connection with said engine and adapted to absorb and dampen noises and vibration occasioned by the transmission of power.

2. A self-propelled car, comprising a main body mounted upon wheels and provided with an engine in power transmitting connection with said wheels, including transmission gearing, and a separate support for said transmission gearing spring-suspended from said main body adapted to remove and isolate the noise and vibration thereof from said main body.

3. A self-propelled car, comprising a main frame mounted upon wheels, an engine in power transmitting connection with said wheels, speed changing devices for said power transmitting connections, and a sub-frame spring suspended from said main frame intermediate said wheels for said devices adapted to absorb and dampen noises and vibration in transmitting power from the engine to the wheels.

4. A self-propelled car, comprising a main frame having an engine mounted thereon, driving wheels for said car, power transmitting devices connecting said engine and wheels, and a sub-frame adapted to support said devices in spring suspensory connection with said main frame.

5. A self-propelled car, comprising a main frame having an engine mounted thereon, wheeled trucks for said car, a sub-frame suspended by springs from said main frame, speed changing devices mounted upon said sub-frame, and power transmitting connections extending between said engine and speed changing devices and the wheels of one of said trucks.

6. A self-propelled car, comprising a main frame mounted upon wheels, a sub-frame in spring suspensory connection with said main frame, an engine mounted upon said main frame, transmission and speed-change gearing mounted upon said sub-frame, and flexible power transmitting connections between said engine and said gearing and said wheels.

7. A self-propelled car, comprising a main frame mounted upon wheels, an engine mounted upon said frame having driving connections with said wheels, a sub-frame suspended apart from said main frame, and power transmitting devices and an air compressor mounted upon said sub-frame and coupled to said driving connections.

8. A self-propelled car, comprising a main frame mounted upon trucks having wheels, an engine mounted upon said main frame, a sub-frame having spring suspensory connection with said main frame, power transmitting and speed changing devices and an air compressor coupled together and mounted jointly upon said sub-frame, power-transmitting connections between said engine and the devices upon said sub-frame, and power transmitting connections extending from one of said devices to at least one set of wheels of said trucks.

9. A self-propelled car, comprising a main frame carrying a gasoline engine, a set of wheeled trucks for said frame, a sub-frame suspended from said main frame intermediate said trucks, power transmitting and speed changing devices mounted upon said sub-frame, a power transmitting shaft extending from said engine and coupled to said devices, and a propeller shaft extending from one of said devices to the wheels of one of said trucks.

10. A gasoline rail car, comprising a main frame, having an engine mounted thereon, a set of trucks having wheels, a sub-frame having spring suspensory connection with said main frame intermediate said trucks, power transmission and speed changing devices and an air compressor coupled together and mounted jointly upon said sub-frame, a power transmitting shaft flexibly coupled to said engine and to said devices, a line shaft operably connected to the speed changing device and journaled in said sub-frame, and a propeller shaft flexibly connected to said line shaft and a plurality of said truck wheels.

11. A self-propelled car, comprising wheeled trucks, a main frame, a cushioned sub-frame intermediate said trucks, power transmitting mechanism mounted upon said sub-frame, and separate power transmitting shafts extending forwardly and rearwardly from said mechanism to the wheels of said trucks.

12. A self-propelled car, comprising a main frame having an engine mounted thereon, wheeled trucks for said car, a sub-frame suspended by springs from said main frame, speed changing devices mounted upon said sub-frame and power transmitting connections extending between said engine and speed changing devices and a set of wheels for each truck, said power transmitting connections having flexible couplings adapted to permit freedom of movement of the sub-frame.

In testimony whereof I affix my signature.

MARTIN P. WINTHER.